United States Patent

Fornaro et al.

[11] Patent Number: 5,291,762
[45] Date of Patent: Mar. 8, 1994

[54] ARMORED COLLAR

[76] Inventors: Luigi Fornaro, 2222 McDonald Ave., Brooklyn, N.Y. 11223; George Spector, 233 Broadway Rm 702, New York, N.Y. 10279

[21] Appl. No.: 27,674
[22] Filed: Mar. 8, 1993
[51] Int. Cl.⁵ .............................. E05B 65/12
[52] U.S. Cl. ........................... 70/18; 70/237; 70/428
[58] Field of Search ............ 70/14, 18, 232, 237, 70/416, 417, 423–428

[56] References Cited

U.S. PATENT DOCUMENTS

| | | | |
|---|---|---|---|
| 4,020,662 | 5/1977 | Fowler | 70/18 X |
| 4,062,193 | 12/1977 | Deleto | 70/18 |
| 4,134,279 | 1/1979 | Ross et al. | 70/18 |
| 4,598,562 | 7/1986 | Freeman | 70/237 |
| 4,712,639 | 12/1987 | Solow | 70/18 X |
| 4,726,207 | 2/1988 | Gifford | 70/237 X |
| 4,781,268 | 11/1988 | Richardson | 70/237 X |
| 4,955,215 | 9/1990 | Eremita | 70/18 |
| 5,036,683 | 8/1991 | Geuvjehizian | 70/18 |
| 5,197,315 | 3/1993 | Zagoroff | 70/237 X |

Primary Examiner—Peter M. Cuomo
Assistant Examiner—Suzanne L. Dino

[57] ABSTRACT

A theft protection collar is provided for a motor vehicle having a steering column with an ignition switch and shift lever and consists of a bracket which is removably connected and located to the steering column. The bracket covers and protects the ignition switch and retains the shift lever to prevent the unauthorized operation thereof.

2 Claims, 1 Drawing Sheet

ARMORED COLLAR

BACKGROUND OF THE INVENTION

The instant invention relates generally to motor vehicle security devices and more specifically it relates to a theft protection collar for a motor vehicle which provides the prevention of an unauthorized operation of an ignition switch and shift lever in the motor vehicle.

There are available various conventional motor vehicle security devices which do not provide the novel improvements of the invention herein disclosed.

SUMMARY OF THE INVENTION

A primary object of the present invention is to provide a theft protection collar for a motor vehicle that will overcome the shortcomings of the prior art devices.

Another object is to provide a theft protection collar for a motor vehicle that will prevent an unauthorized operation of both an ignition switch and a shift lever on a steering column in the motor vehicle.

An additional object is to provide a theft protection collar for a motor vehicle that is adjustable, so as to fit various sized steering columns, ignition switches and shift levers in different motor vehicles.

A further object is to provide a theft protection collar for a motor vehicle that is simple and easy to use.

A still further object is to provide a theft protection collar for a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
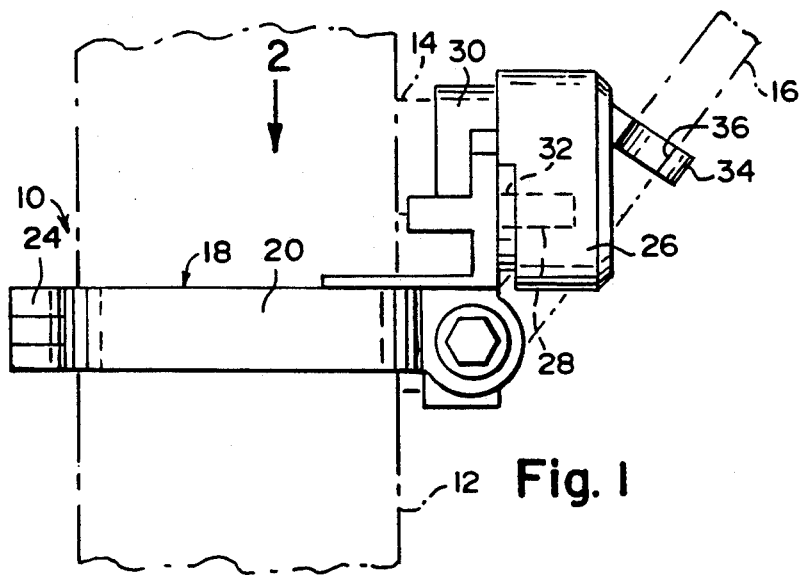
FIG. 1 is a side view of the instant invention.
Figure 2:
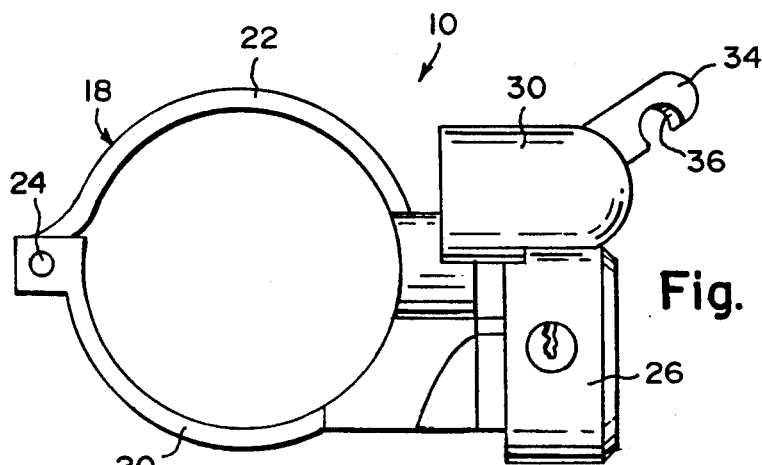
FIG. 2 is a top view taken in direction of arrow 2 in FIG. 1.

Turning now descriptively to the drawings, in which similar reference characters denote similar elements throughout the several views, FIGS. 1 and 2 illustrate a theft protection collar 10 for a motor vehicle having a steering column 12 with an ignition switch 14 and shift lever 16. The collar 10 consists of a bracket 18 being of two pieces 20 and 22 for encircling the steering column 12. A hinge 24 is for joining the two pieces 20 and 22 of the bracket 18 together. A lock 26 having a dead bolt 28 is mounted to the first piece 20 of the bracket. A cover 30 is mounted to one side of the lock 26 for preventing access to the ignition switch 14. The second piece 22 of the bracket 18 has a recess 32 for receiving the dead bolt 28 of the lock 26, so as to retain the bracket 18 to the steering column 12, to prevent an unauthorized operation of the ignition switch 14.

The theft protection collar 10 further includes a retainer arm 34 having a notch 36. The retainer arm 34 extends from the cover 30, so that the notch 36 can engage with the shift lever 16 to stop movement of the shift lever 16 and to prevent an unauthorized operation of the shift lever 16.

Figure 3:
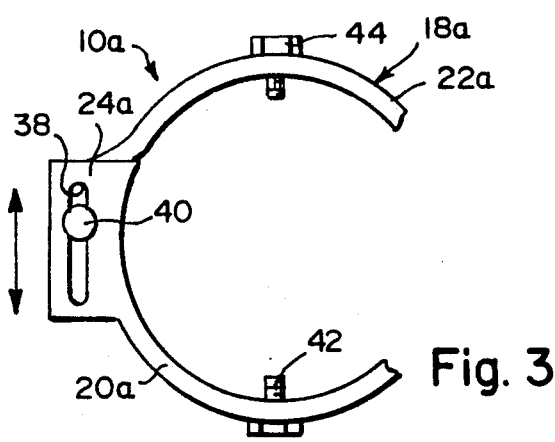
FIG. 3 is a top view of a first modification with parts broken a showing an adjustable bracket to fit different diameter steering columns.

A modified theft protection collar 10a is shown in FIG. 3. The hinge 24a is adjustable and has an elongate slot 38 therein, so that a pin 40 of the hinge 24a can ride within the slot 38. The first piece 20a of the bracket 18a has a first set screw 42 extending therethrough. The second piece 22a of the bracket 18a has a second set screw 44 extending therethrough, so as to fit different diameter steering columns 12.

Figure 4:
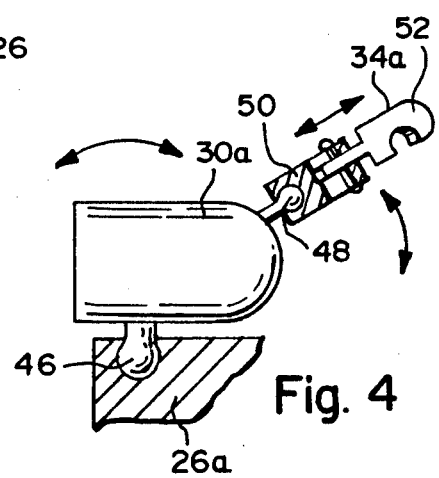
FIG. 4 is a top view of a second modification with parts broken away and in section showing an adjustable ignition switch cover and an adjustable shift lever retainer arm to fit various arrangements of the ignition switch location relative to the shift lever.

In FIG. 4, a first ball joint 46 is between the cover 30a and the one side of the lock 26a. A second ball joint 48 is between the cover 30a and the retainer arm 34a. The retainer arm 34a is in two telescopic adjustable segments 50 and 52, so that the cover 30a and the retainer arm 34a will now fit various arrangements of the location of the ignition switch 14 relative to the shift lever 16 on the steering column 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A theft protection collar for a motor vehicle having a steering column with an ignition switch and shift lever, said collar comprising:
   a) a bracket being of two pieces for encircling said steering column;
   b) a hinge for joining said two pieces of said bracket together;
   c) a lock having a dead bolt, said lock mounted to said first piece of said bracket;
   d) a cover mounted to one side of said lock for preventing access to said ignition switch;
   e) said second piece of said bracket having a recess for receiving said dead bolt of said lock, so as to retain said bracket to said steering column to prevent an unauthorized operation of said ignition switch; further including a retainer arm having a notch, said retainer arm extending from said cover, so that said notch can engage with said shift lever to stop movement of said shift lever and prevent an unauthorized operation of said shift lever; further including:
   f) said hinge being adjustable and having an elongated slot therein, so that a pin of said hinge can ride within said slot;
   g) said first piece of said bracket having a first set screw extending therethrough; and
   h) said second piece of said bracket having a second set screw extending therethrough, so as to fit different diameter steering columns.

2. A theft protection collar for a motor vehicle as recited in claim 1, further including:

a) a first ball joint between said cover and said one side of said lock;
b) a second ball joint between said cover and said retainer arm; and
c) said retainer arm being in two telescopic adjustable segments, so that said cover and said retainer arm will now fit various arrangements of the location of said ignition switch relative to said shift lever on said steering column.

* * * * *